United States Patent [19]

Dillon

[11] Patent Number: 4,903,292
[45] Date of Patent: Feb. 20, 1990

[54] SYSTEM FOR TRANSMITTING LOW FREQUENCY TONES THROUGH A DIGITAL LOOP CARRIER SYSTEM

[75] Inventor: Philip L. Dillon, Arlington, Tex.

[73] Assignee: Reliance Comm/Tec Corporation, Chicago, Ill.

[21] Appl. No.: 265,718

[22] Filed: Nov. 1, 1988

[51] Int. Cl.⁴ .......................................... H04M 11/06
[52] U.S. Cl. ....................................... 379/93; 379/50; 379/64; 370/76; 370/110.2; 370/85.15
[58] Field of Search ...................... 379/93, 94, 47, 50, 379/64, 65; 370/76, 70, 69.1, 110.2, 110.3, 86

[56] References Cited

U.S. PATENT DOCUMENTS

| | | | |
|---|---|---|---|
| 4,262,283 | 4/1981 | Chamberlain et al. | 379/47 |
| 4,442,320 | 4/1984 | James et al. | 379/50 |
| 4,521,643 | 6/1985 | Dupuis et al. | 379/50 |

OTHER PUBLICATIONS

National Semiconductor Corporation catalog entitled, "Telecommunications Data Book", 1987 edition, pp. 1-119 and 1-125 entitled TP3040/TP3040-1/TP30-40A/TP3040A-1 PCM Monolithic Filter.

Primary Examiner—Jin F. Ng
Assistant Examiner—Wing F. Chan
Attorney, Agent, or Firm—Michael M. Rickin

[57] ABSTRACT

A system for use in a digital loop carrier (DLC) which allows low frequency (sub-audible) tones such as those used with alarm systems to be transmitted from one end of the DLC to the other end even though the DLC has been designed to reject signasl below 200 Hz. The system may be added to an already installed DLC or included with the DLC prior to installation. At the end of the DLC from which the low tone is to be transmitted, the system controls the amplitude of the tone so that it can be encoded for transmission within a predetermined window. The DLC allows such low frequencies to be transmitted through the window while still rejecting 60 Hz signals (and its lower order harmonics). The controlled low tone and the voice signals are combined for transmission to the other end. At the other end, the decoded low tone is amplified by the system and then recombined with the decoded voice signals for use therein.

20 Claims, 4 Drawing Sheets

SYSTEM FOR TRANSMITTING LOW FREQUENCY TONES THROUGH A DIGITAL LOOP CARRIER SYSTEM

BACKGROUND OF THE INVENTION

1. Field of the Invention

This invention concerns itself generally with the transmission of low frequency sub-audible tones over digital loop carrier, and related thereto, with providing alarm services over digital loop carrier (DLC). More specifically, it is concerned with the transmission of alarm related signals over DLC channels which simultaneously provide facilities for the subscriber's normal residence or business plain ordinary telephone service (POTS).

2. Description of the Prior Art

The specific type of alarm reporting and collecting system concerned transmits a pilot tone, at a frequency in the sub-audible range below the normal voice band, as an "all is well" indication to scanning equipment in the central office. The scanning equipment communicates with the subscriber terminal unit (STU) provided by an alarm company at the subscriber's premises by means of bi-directional frequency shift keying (FSK) data transmission, using carrier frequencies at the upper end of the telephone voice band, in the 2700 to 3000 Hz range. When the subscriber is on-hook, his STU is polled at regular intervals on the order of 30 seconds, regardless of the presence of the low frequency pilot tone, hereinafter referred to as "low tone", and either gives a positive "all is well" response if its alarm conditions are normal, or reports any abnormal conditions to the scanner.

Normally, the subscriber does not wish to be bothered by these audible tones when engaged in conversation or non-alarm related data transmission, or at least wants the frequency of their occurrence to be substantially reduced. Accordingly, when the subscriber is off-hook and low tone is present, the scanner either does not attempt to communicate with the STU at all, or only polls it at much longer intervals. If an alarm is registered by the STU, the STU cuts its low tone, and the scanner, on detection of low tone loss, scans the off-hook line. The scanner, or equipment associated with it, passes the alarm indication to the alarm company, which then initiates further communication with the STU, via the scanner, using the previously mentioned FSK data signals, with the central office located equipment relaying the information.

Since this alarm service uses the same transmission facilities as the subscriber's POTS service, it can be provided more cheaply than more conventional alarm systems such as McCulloh loops, which require a separate, dedicated facility. Prior to the present invention, however, this service could not be provided over DLC channels because they have excessive transmission losses at the low tone frequency, and often do not provide bidirectional voice frequency transmission in the on-hook state. Since the use of DLC by telephone companies to provide POTS is increasing rapidly, the incompatibility of conventional DLC channels with this type of alarm service is becoming increasingly troublesome to them. If a subscriber is currently served via DLC when the alarm service is ordered, they must either deny service, or switch the subscriber to a more expensive metallic facility, if in fact one is available. Worse yet, if the subscriber already has alarm service, he cannot be switched over to DLC without discontinuing his alarm service, which is extremely distasteful, and as a practical matter, probably impossible for the telephone company. Thus, it can be seen that inability to furnish alarm service as described herein via DLC causes maintenance, administrative, and public relations problems for telephone companies who include such service in their tariffed offerings.

For a DLC channel to be compatible with such alarm service, two characteristics are essential:

1. A one-way transmission path at the low tone frequency, with acceptable transmission loss, must be provided in both the on-hook and off-hook states, from the STU to the CO through the DLC channel, 2. A two-way voice band path for transmission of the FSK signals must be maintained, both in the on-hook and the off-hook states, through the DLC channel. It is a general requirement that DLC systems provide a two-way voice frequency transmission path at all times on non-concentrated channels.

It is desirable that any modification to the DLC so that it is compatible with such alarm service be in the form of circuitry which can be added as needed to both the subscriber and central office portions of the DLC. It is also desirable that any such added circuitry not impair the performance of the two-way path in the DLC. It is further desirable that any such circuitry not respond to the low tone in any way other than to ensure that it can be transmitted "as is" from the remote terminal to the central office. The circuitry will then not cause a spurious signals to be received which indicates the presence of the low tone when the same is not present. The system of the present invention not only allows the DLC to be compatible with such alarm service and meets the other requirements described above but is also in the form of circuitry that can be added to the DLC when needed.

SUMMARY OF THE INVENTION

A digital loop carrier which has two ends and a transmission media connecting the ends. The first end has a circuit which passes to its output only that part of an analog signal at its input which is in a predetermined frequency band. The first end also has a circuit which passes only a tone in the analog signal which has a frequency below the predetermined frequency band. The tone passing circuit also controls the amplitude of the tone to fall within a predetermined amplitude range. The first end also has a circuit which responds to the analog signal at the output of the first circuit and the amplitude controlled tone for encoding the analog signal and tone into a digital signal for transmission by the transmission media to the second end.

DESCRIPTION OF THE PREFERRED EMBODIMENT

Figure 1:
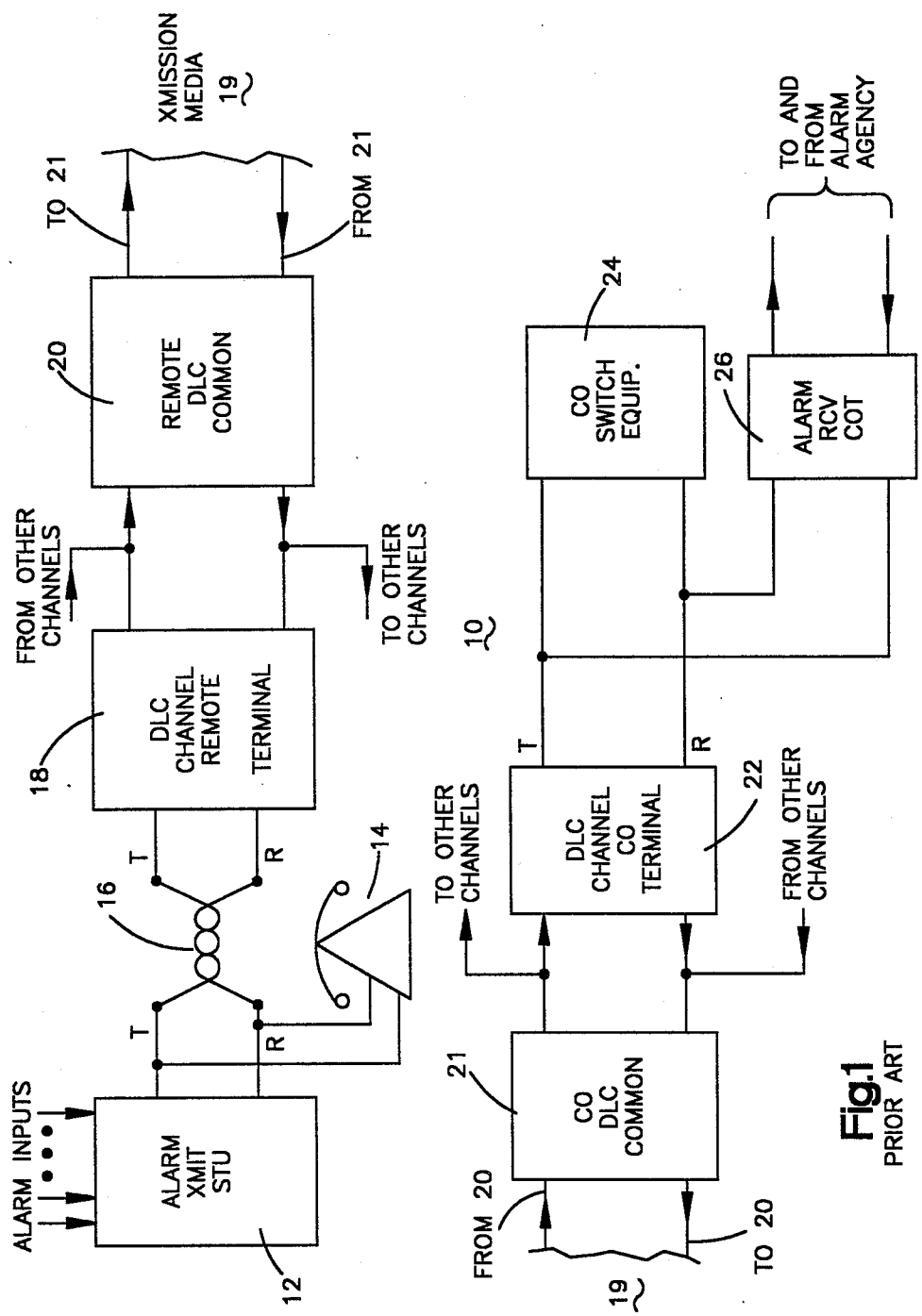
FIG. 1 is a block diagram of a typical digital loop carrier system that also includes an alarm system.

FIG. 1 shows a block diagram of a telephone circuit 10 embodied in accordance with the present invention for furnishing the above described alarm service with a DLC channel interposed. The STU 12, which monitors its alarm inputs and communicates with the central office located alarm equipment, and through it with the alarm agency, is connected to the tip (T) and ring (R) conductors of the telephone cable pair 16 in parallel with a telephone 14. Although only one telephone is shown, it will be understood that several telephones may actually be present. Furthermore, it is a requirement that low tone be received at an acceptable level in the central office with two telephones simultaneously off-hook. It is also possible that terminal equipment other than telephones, modems for example, may be connected to the T and R conductors as well.

The customer premises is connected to the remote channel unit (RT) 18 of the DLC by means of cable pair 16 which can range in length from very short to 12 kilofeet. The DLC channel unit 18 has an interface with the DLC common equipment 20 which processes signals received from the channel unit as required, and then delivers them to the transmission media 19 in suitable form. The common equipment also proceeds signals received from the transmission media 19 as required, and delivers them to the channel unit in suitable form. The transmission media 19 between the DLC remote terminal (RT) and DLC central office terminal (COT) 22 may be copper pairs, optical fibers, a radio link, or other media. In the present invention, the low tone is processed in the channel unit 18, and delivered with the voice signals to the common equipment 20 for transmission to the central office.

At the central office, the COT DLC channel unit 22 has an interface, similar to that existing at the remote location, with the DLC system COT common equipment 21 which is connected to the transmission media. The central office side of the COT channel unit 22 is connected to both the central office switching equipment 24 and the alarm receiving equipment 26. The low tone signal is recovered and processed by the channel unit 22, and then delivered to the alarm receiving equipment 26 at a suitable voltage level. The alarm receiving equipment contains means for detecting the low tone, for transmitting and receiving FSK signals between itself and the STU, and for communicating with the alarm agency.

Before discussing the embodiment of the invention shown in FIGS. 2 to 5, it is helpful to introduce some concepts which are useful in understanding that embodiment. The scheme used in North America, excluding Mexico, for encoding analog signals into digital form for transmission over the public network is called mu255. It employs a 15 segment companding law, and has an approximately 72 dB dynamic range. A reference digital signal, the digital milliwatt, has been defined. The digital milliwatt, when decoded by an ideal zero level decoder, will produce a zero dBm, 1000 Hz sinusoidal signal into the reference impedance of the decoder. The highest level sinusoidal signal which can be encoded by an ideal zero level encoder is +3.17 dBm. A signal with a peak value less than that of a sinusoid at approximately -69dBm has no effect on the output of a zero level encoder and will not be encoded at all.

It is a convenient in this discussion to use the concept of equivalent power of a digital signal. A digital signal has an equivalent power of X dBm (X EdBm), if when decoded by a zero level decoder it produces an analog signal at X dBm.

The frequency response, with respect to 1000 Hz loss, for a digital transmission system intended for POTS, is generally required to be flat ±1 dB from 400 to 2800 Hz, with the requirement generally being allocated 50% to each end, and at least 20 dB down at 60 Hz, considering the transmitting end only. Commercially available low frequency integrated circuit filters used for this purpose are generally quite flat from 300 to 3000 Hz, down 1.25 to 1.5 dB at 3400 Hz, down perhaps one dB at 200 Hz transmit only, and down much more than 20 dB at 60 Hz and below transmit only. In order to control aliasing in the transmit direction, and to reject high frequency components present in the received decoded waveform, the low frequency filters are at least 14 dB down at 4000 Hz, and at least 32 dB down (transmit) or 28 dB down (receive) at 4600 Hz. Generally, the transformers used to couple the electronics to the subscriber or CO line also introduce substantial losses at frequencies of 60 Hz and below.

The above described low frequency filter and transformer characteristics are the primary reason for the inability of digital transmission systems to pass very low frequency signals; the mu255 companding law, per se, imposes no low frequency restrictions. The requirement for good rejection at 60 Hz stems from the fact that currents at this frequency are nearly always longitudinally induced at some level, no matter how low, into the telephone conductors from the commercial power system. The limited dynamic range and other non-linearities of digital systems can enhance the noise which results from these currents, compared with the noise which would have been produced in a completely linear system with equal longitudinal-to-metallic balance.

For example, assume that the background noise in the channel is too low to encode without any induced AC being present. Now let a low level 60 Hz signal be introduced such that the noise plus 60 Hz just crosses the first, or first several decision thresholds of the encoder at or near the peaks of the 60 Hz signal. What results is that the noise becomes encodeable near the peaks of the 60 Hz signal, or with increasing 60 Hz interference, a combination of noise and 60 Hz is encoded. The result is that bursts of noise are transmitted at a 60 Hz rate. This manifests itself as an audible 60 Hz raspiness. Since the unwanted signal is basically voiceband noise interrupted at a 60 Hz rate, it passes through the receiving circuits and transformers at the distant end practically unattenuated, which the 60 Hz itself could not have done.

This is far more objectionable than the original noise would have been, had it somehow been possible to transmit it in the absence of the 60 Hz interference. Not only has the noise been effectively amplified, being biased up so that it can trigger decision levels higher than justified by its actual amplitude, it is delivered at a quite noticeable 60 Hz rate. Further, the 60 Hz signal itself, to the extent that it can be said to be encoded, is badly distorted, since only its amplitudes near crest value are over threshold, and no samples are encoded for large sections of the waveform. Accordingly, harmonics of 60 Hz are produced which are more objectionable than the 60 Hz itself.

If the interfering level were higher, the effect would be less objectionable, since the 60 Hz would be accurately encoded, very little distortion would be produced, and the entire system from end to end would behave in a more linear fashion. If the 60 Hz level were further increased, a point would be reached at which the quantizing distortion of the 60 Hz signal would become objectionable, even though the fundamental itself might not be. Quantizing distortion due to low frequency signals is generally more troublesome than that due to higher frequencies, since more of its components fall in band, and cannot be filtered out. Since induced 60 Hz levels are not controlled, and it is an unwanted signal to begin with, it is clear that attempting to prevent 60 Hz signals from being encoded is a reasonable strategy.

As the above discussion illustrates, I have found that it is quite possible to transmit a sub-audible signal simultaneously with voice signals through a digital transmission system, although the efforts made to keep 60 Hz out of digital systems condition a general belief in those skilled in the art to the contrary. If care is taken, and the low frequency signal is encoded at suitable levels, such a signal can be combined with the voice signals present on the channel, and transmitted through the system without interfering with the voice signals, or causing a significant increase in noise. The level of the subaudible signal must be controlled, rather than simply limited, since it can generate noise if it is applied to the encoder at too low, as well as at too high a level. This is the principle on which the present invention rests.

In the embodiment herein described, the low tone is coupled to a narrowband filter, to reject all signals except a narrow band centered at the low tone frequency. The transmitting low tone filter has sufficient rejection at 60 Hz to assure that the 60 Hz relative attenuation requirement is met. The low tone is then reduced to a suitable level for encoding and combined with the void frequency signals emerging from the normal voice frequency bandpass filter. The composite signals is then encoded.

At the receiving end, the output of the normal voice frequency low pass and sample and hold compensation filter is applied to a second narrowband filter to permit the extraction and selective amplification of the attenuated low tune signal. The filtered amplified low tone signal is then combined with the other voice signals and transmitted through the voiceband line interface to the CO switching equipment and alarm collecting equipment.

Due to the high transmission losses at the low tone frequency in the reverse direction, virtually no power is returned to the sending end, even though the transhybrid loss at the low tone frequency is extremely poor; thus, low frequency stability is assured. In the embodiment the low tone frequency is 36.075 Hz, hereinafter to be referred to as 36 Hz, but it will be understood that the embodiment can be adapted to other frequencies simply by changing component values.

For any subaudible frequency chosen, I have found that the encoding level at which the digital system begins to behave sufficiently linearly to control the previously described raspy noise enhancement effect is −59 EdBm. I have also found that the maximum level at which the subaudible frequency may be encoded without causing an objectionable noise increase depends on the frequency chosen, for 36 Hz, it is approximately −42 EdBm. It can thus be seen that a 17 dB "amplitude window" exists through which the 36 Hz can be satisfactorily transmitted. Since the low tone, in the off-hook condition, always arrives at the RT within a 10 dB amplitude range, this is entirely satisfactory.

In the following detailed descriptions of the embodiment, the drawings are simplified, showing only those parts of the channel circuitry which relate to the transmission of the low tone and to the required voiceband bidirectional capability. Circuitry required for ringing, dialing, and test system compatibility have been omitted. Such circuitry is, however, well known in the art.

Figure 2:
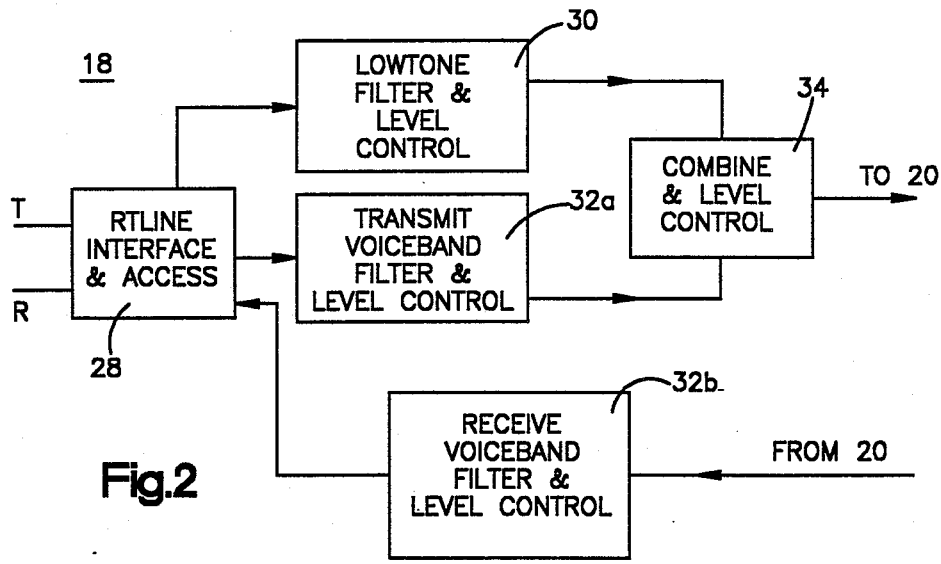
FIG. 2 is a block diagram of the remote terminal of the typical digital loop carrier system which is alarm system compatible in accordance with the present invention.
Figure 3:
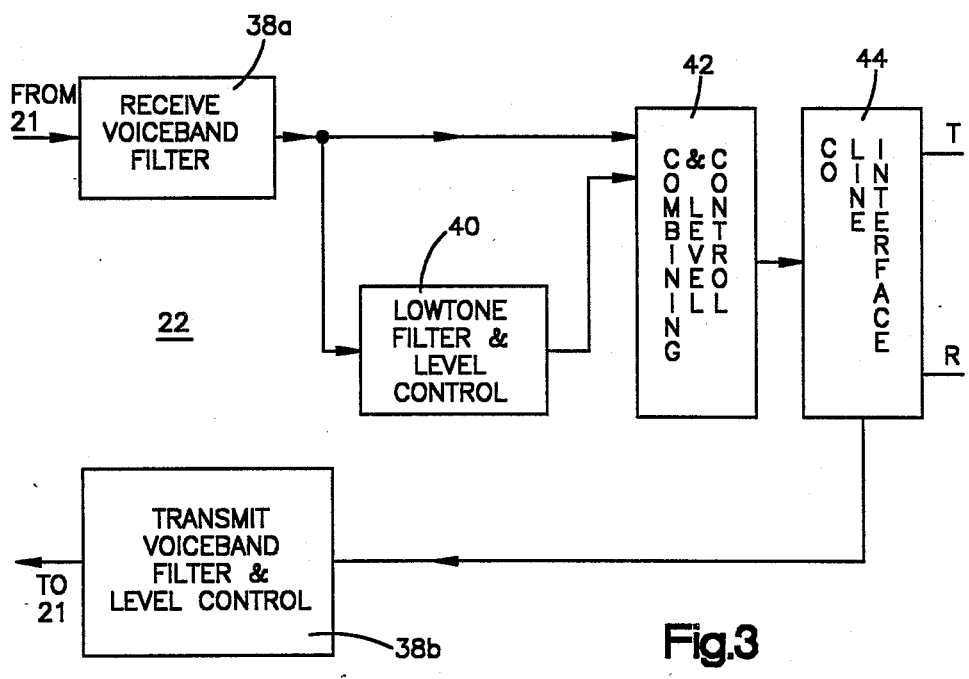
FIG. 3 is a block diagram of the central office terminal of the typical digital loop carrier system which is alarm system compatible in accordance with the present invention.
Figure 4:
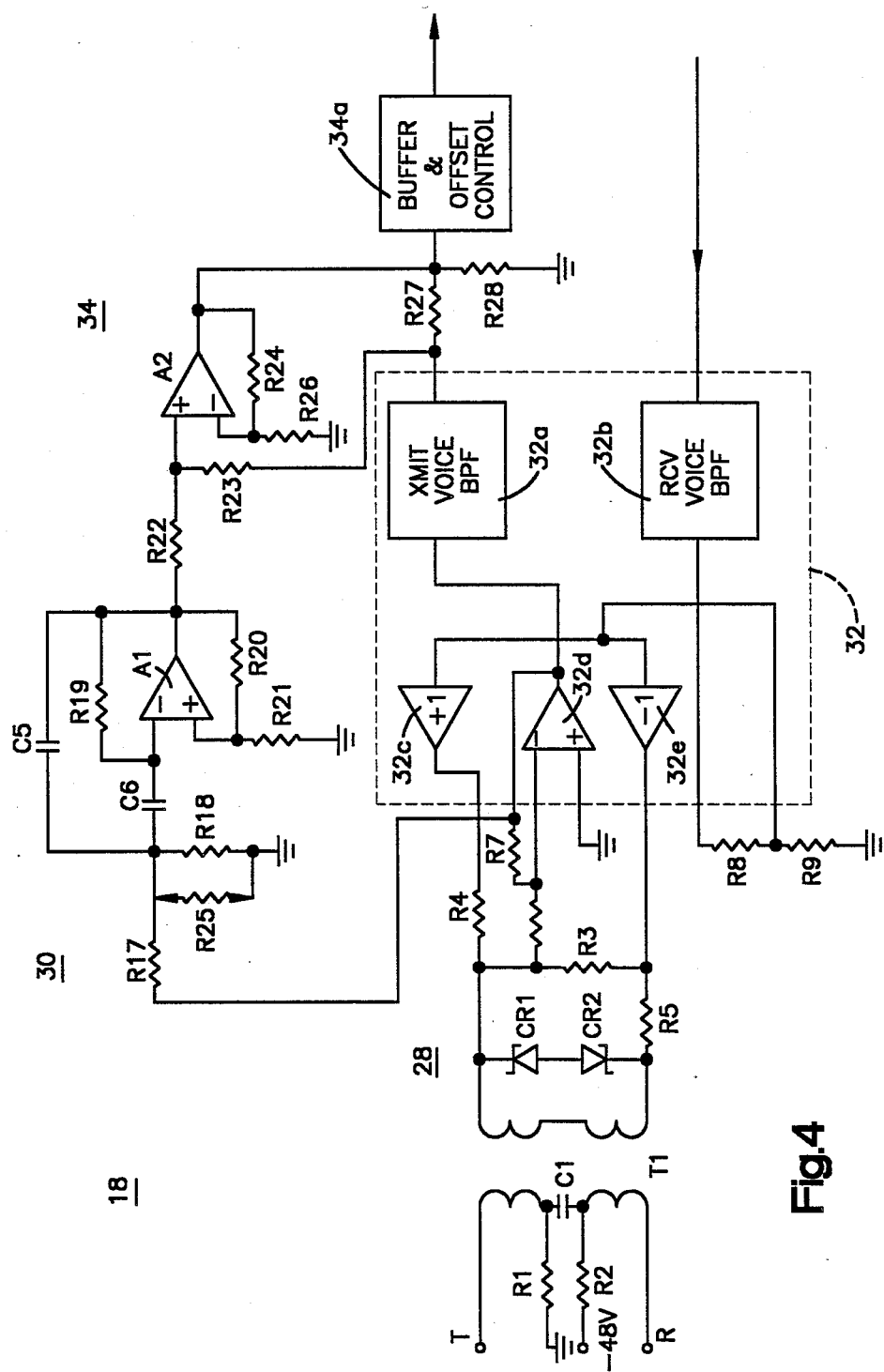
FIG. 4 is a simplified schematic circuit diagram for the remote terminal of FIG. 2.
Figure 5:
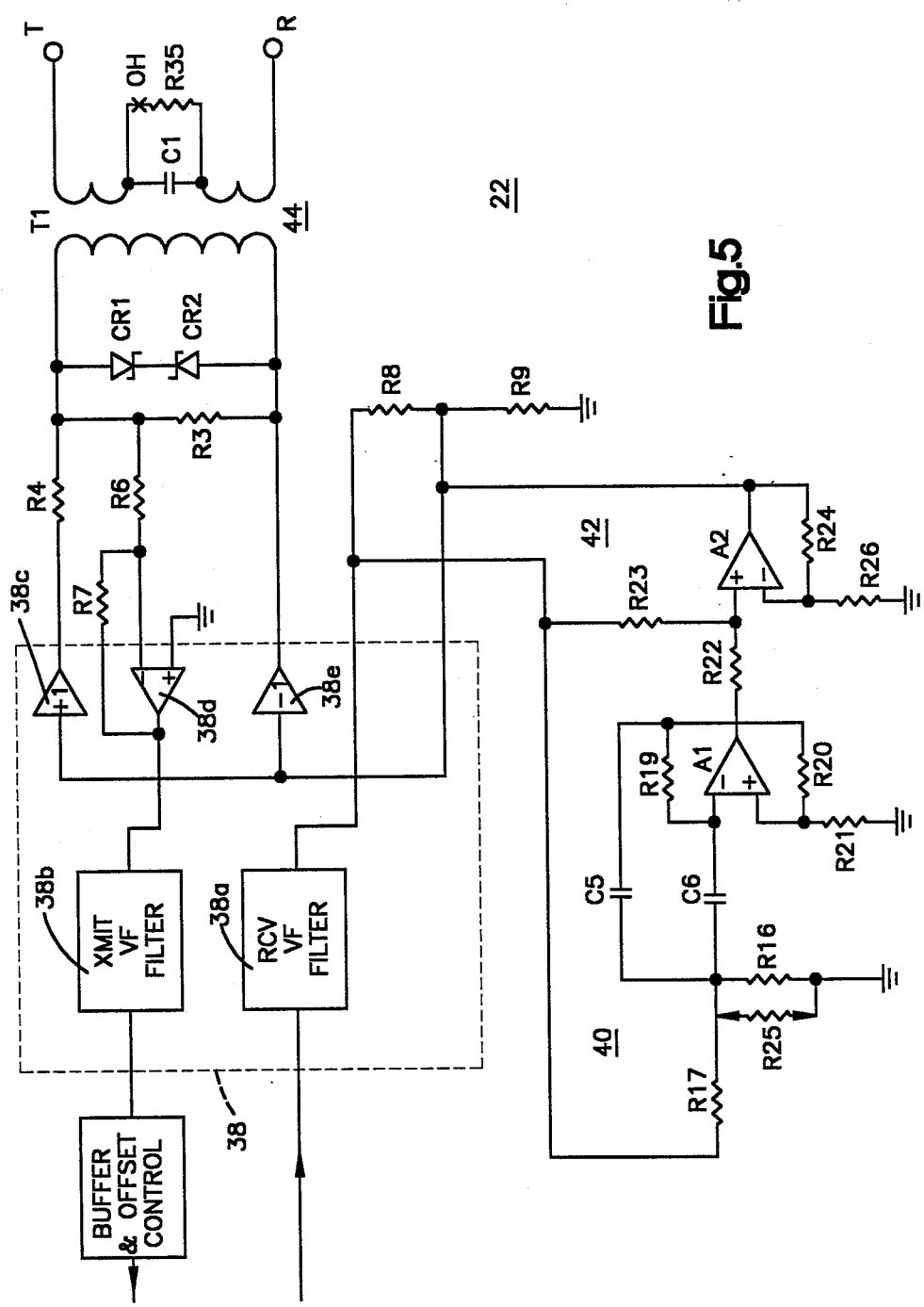
FIG. 5 is a simplified schematic circuit diagram for the central office terminal of FIG. 3.

The circuit schematic for the preferred embodiment of the invention is illustrated in FIGS. 4 and 5 with block diagrams therefor being shown in FIGS. 2 and 3, respectively. It will be seen that the topology of the low tone transmission and combining circuitry is identical at both the RT and COT, a development permitting use of identical printed wiring arrangements for those circuit parts at both the COT and RT.

Referring to FIG. 2, there is shown a block diagram for the remote terminal (RT) 18 of a digital loop carrier which is alarm system compatible. RT 18 includes line interface and access circuit 28 which is connected to the T and R conductors to receive both the voiceband signals and the low tone to be transmitted to the central office. Circuit 28 has one output connected to the input of low tone filter and level control circuit 30. Circuit 28 has another output connected to the input of transmit voiceband filter and level control circuit 32a.

Circuit 30 is a narrowband bandpass filter centered at the 36 Hz frequency of the low tone to reject signals which are not the low tone. Circuit 30 also provides control of the amplitude level of the low tone so as to ensure that its encoded level falls within the amplitude window described above. Circuit 32a is a low pass filter whose passband is in the telephone voiceband to reject signals which are not in the telephone voiceband. Therefore, circuit 32 rejects the low tone from the signal at its input while circuit 30 rejects voiceband signals from its input signal. Circuit 32a also provides control of the amplitude level of the voiceband signals. Circuits 30 and 32a both reject 60 Hz signals.

The output of circuit 30 and 32a are both connected to the input of combining and level control circuit 34. Circuit 34 functions to combine the filtered and level controlled low tone with the filtered and level controlled voiceband signals. Circuit 34 provides a fine adjustment to the level controls provided by circuits 30 and 32a. The output of circuit 34 is connected to the RT common equipment 20 which among other things encodes the combined low tone and voiceband signals for transmission to the central office.

It should be appreciated that the level of the low tone in the combined signals is such that the encoded level is within the previously described amplitude window. It should further be appreciated that while circuit 34 has been described as providing level control to the combined signal, that all such control can be provided by circuits 30 and 32a.

Receive voiceband filter and level control circuit 32b is not associated with the transmission of the low tone. As described above, the low tone is transmitted only from the subscriber to the central office. Therefore, circuit 32b functions in a manner identical to the receive voiceband filter and level control circuit in the RT of a DLC which does not have the alarm system compatibility of the present invention.

Referring now to FIG. 3, there is shown a block diagram for the central office terminal (COT) 22 of the DLC having the alarm system compatibility of the present invention. COT 22 includes receive voiceband filter circuit 38a. The encoded composite low tone and voiceband signal received at the central office from the subscriber is first decoded into PAM samples by the COT common equipment 21. The PAM samples are then reconstructed by a sample and hold circuit into a stair step approximation to the original signal encoded at the RT. Receive voiceband filter circuit 38a reconstructs the encoded composite low tone and voiceband signal by both removing any distortion introduced by the sample and hold circuit and any high frequency components in the stair step approximation.

The reconstructed combined low tone and voiceband signal is then applied to the input of the low frequency narrowband filter and level control circuit 40. Circuit 40 has a narrow passband centered about the low tone frequency to thereby reject all frequencies in the combined signal other than the low tone. Circuit 40 also provides gain to the low tone to substantially increase its amplitude as compared to the low tone amplitude at the output of circuit 38a.

The output of circuits 38 and 40 are both received at the input to combining and level control circuit 42. Circuit 42 recombines the amplified and filtered low tone from circuit 40 with the combined signal from circuit 38a. Circuit 42 also provides appropriate level control so that the low tone is delivered to the interface circuit 44 with the proper level. the transmission path in COT 22 is not associated with the low tone. Therefore, transmit voiceband filter and level control circuit 38b functions in a manner identical to the same circuit in a DLC which does not have the alarm system compatibility of the present invention.

Referring now to FIG. 4, there is shown a simplified schematic diagram for that part of RT 18 which is associated with transmission of the low tone and voiceband signals to the central office. The low tone and voiceband signals are coupled through transformer $T_1$ to the two wire to four wire hybrid formed by resistors R3, R4, R6 and R7, and the amplifiers inside the integrated circuit (IC) chip which has been used to implement the voiceband filter and level control circuit 32.

As shown in simplified form in FIG. 4, circuit 32 includes a transmit voiceband bandpass filter 32a, a receive voiceband lowpass filter 32b and operational amplifiers 32c, 32d and 32e. The low tone and voiceband signals are connected to amplifier 32d which functions as an inverting amplifier. The input to the low frequency narrowband filter and level control circuit 30 is connected to the output of inverting operational amplifier 32d. The output of amplifier 32d is also connected to the input of circuit 32a which functions to band limit the voiceband signals. The bandpass characteristics of circuit 32a severely attenuate the low tone.

Circuit 30 acts as a low tone filter and provides level control to the low tone so that the encoded level of the low tone falls within the amplitude window. Operational amplifier A1 and associated components, i.e., resistors R17, R18, R19, R20, R21 and R25, and capacitors C5 and C6, of circuit 30 function as the low tone bandpass filter. The resistance of resistor R25 is selected to fine tune the filter center frequency.

The transformer $T_1$ is selected to have a reasonably large and fairly constant inductance. These characteristics make is possible to internally access the voiceband path in order to deliver the low tone signal to the 36 Hz filter 30. Since the IC 32 is powered by ±5V, and the low tone filter 30 is powered by ±12V, the low tone filter 30 cannot be overloaded. The output of the transmitting amplifier in the IC, therefore, drives both the transmit voiceband bandpass filter 32a and the 36 Hz bandpass filter. Hereinafter, when referring to 36 Hz levels at all points, and to voiceband signal levels at points interior to the RT or COT channel units, the following convention is adopted:

0 dB means 0.948 VRMS i.e., the voltage which would produce 0 dBm in 900 ohms. It will be understood that the impedance levels at points referenced may vary substantially from 900 ohms. A low tone signal applied to the T and R terminals at −27 dB typically appears at the low tone filter input at −38 dB. The filter 30 is operated at 3.5 dB loss.

The output of filter 30 and IC 32 are both connected to the input of circuit 34. Circuit 34 is embodied in the form of a combining amplifier A2. The output of filter 30 is connected to the input of amplifier A2 through resistor R22. The output of IC 32 is connected to the input of amplifier A2 through resistor R23.

The combining amplifier A2 is operated in a non-inverting configuration. The transmit voiceband bandpass filter 32a drives both the second input of the combining amplifier through resistor R23, and an attenuator (formed by resistors R27 and R28) which is superfluous when the low tone transmission circuitry is provided. When a zero level 1000 Hz signal is applied to the T and R conductors, it appears at the output of the transmit voiceband bandpass filter at +2.15 dB. low tone signals at this same point will typically have been reduced to −88 dB. As resistors R22 and R23 are selected to be of equal value, they introduce a 6 dB loss at the combining amplifier input, to both the low tone and voiceband inputs. The amplifier itself is operated at a 2.5 dB gain, so that the low tone signal emerges at −45 dB, and the 1000 Hz tone emerges at −1.4 dB.

The combined or composite signal is then applied to the midpoint of the attenuator formed by resistors R27 and R28 at the input to the buffer amplifier and dc offset control circuit 34a. Circuit 34a functions both as a buffer and to remove any DC offset in the combined signal. Failure to remove any such offset will adversely affect the encoding of the combined signal.

Since the combining amplifier has a near-zero output impedance, the signal driven through resistor R27 from the voiceband bandpass filter 32a is reduced to zero, and only the signals from the combining amplifier output drive the buffer amplifier and dc offset control circuit 34a. The 1000 Hz signal, after passing through the buffer amplifier and dc offset control circuit, is encoded at −2 EdBm, so that at 1000 Hz, the output of the combining amplifier is a +0.6 encode level point (ELP), i.e., a voltage level of +0.6 dB causes a digital milliwatt to be encoded. The buffer amplifier and dc offset control circuit, however, introduce an additional 2.2 dB loss at 36 Hz, so that the low tone signal is encoded at −47.8 EdBm, which is suitably located in the "amplitude window". The 60 Hz signals arriving at the low tone filter output are typically down 37 dB; those arriving at the output of the transmit voiceband filter are typically down 43 dB. Allowing for the combining amplifier's net 3.5 dB loss, and for an additional one dB of 60 Hz loss in the buffer amplifier and dc offset control circuit, encoded 60 Hz signals are down at least 38 dB, even if they have combined in phase; thus, the 60 Hz rejection requirement (20 dB) is easily met.

The receive direction is not associated with the low tone transmission path. It is clear that since the RT circuitry is energized at all times in accordance with the general requirement that a DLC maintain a two-way path that a bi-directional voiceband path for FSK signals always exists at and within the RT channel unit. The present invention does not impair the operation of the RT channel unit.

FIG. 5 depicts the simplified schematic diagram for COT channel unit 22 of the present invention. Circuit 38 is embodied in the form of an integrated circuit (IC) chip which includes a receive lowpass sample and hold compensation filter 38a. The IC used to embody circuit 38 is the same as the IC used to embody circuit 32 and may, for example, but the type TP 3040 PCM monolithic filter chip available from National Semiconductor Corporation of Santa Clara, Calif. A digital milliwatt is decoded as a sampled and held voltage of +4 dB. Accordingly, the low tone is decoded as −43.8 dB at the input to the receive lowpass sample and hold compensation filter 38a, and emerges from the filter at the same level to drive the low tone bandpass filter 40 embodied in the form of operational amplifier A1, the voiceband input to the combining amplifier A2 through resistor R23, and the attenuator formed by resistors R8 and R9. The same reference designators are used wherever possible in FIG. 5 for the components of circuit 22 as was used in FIG. 4 for the components of circuit 18 in order to show the functional similarity between circuits 18 and 22.

The low tone filter, is operated at a gain of 20 dB, and the low tone emerges from it at a level of −23.8 dB to drive the low tone input of the combining amplifier through resistor R22. In this case, resistors R22 and R23 are not equal, and serve to adjust the voiceband and low tone signals to the proper relative levels at the input to the combining amplifier. Resistors R24 and R26 set the gain of the combining amplifier, which compensates for the loss of the combining network formed by resistors R22 and R23, and delivers the low tone signal at a level of −15.6 dB to the center of the voltage divider formed by resistors R8 and R9 at the input to the differential amplifier 38c.

A 1000 Hz signal applied to the RT at zero level would appear at this same point at a level of +0.2 dB. The attenuator formed by resistors R8 and R9 serves no purpose when the low tone transmission circuitry is provided, and only the signal emanating from the combining amplifier reaches the differential amplifier. The differential amplifier impresses the composite signal on the hybrid circuitry and transformer T1 (selected in the manner described for transformer T1 of FIG. 4), with the result that the low tone is delivered to a 900 ohm termination across T and R terminals at a typical level of −26.3 dBm. Since the low tone signal has been fed through the normal hybrid circuit path, voiceband components which pass through the filter skirts are subjected to a normal transhybrid loss, and the return loss seen looking into the channel unit at the RT is not significantly affected.

Even though the transhybrid loss at 36 Hz is poor in this embodiment, the 36 Hz loss through the transmit voiceband bandpass filter 38b is at least 55 dB, and it alone is more than sufficient to prevent the low tone signal from returning to the RT at significant levels.

In the on-hook state, contact OH is open, the loss at 36 Hz through the transformer and hybrid circuitry increases by about 4 dB so that the on-hook loss measured between 900 ohm terminations is about 3.3 dB. In the on-hook state, however, the low tone input level at the RT typically increases by 18 dB or so, since the loading effect of the off-hook telephone is eliminated. Accordingly, the level actually increases, rather than decreases at the COT, by about 14 dB, when the COT is terminated in 900 ohms.

Since the CO impedance at the low tone frequency is usually much greater than 900 ohms, the increase in off-hook level is usually 17 dB or more. The increased transmit level in the on-hook state causes the encoded low tone signal to exceed the upper limits of the previously mentioned "amplitude window", causing an increase in noise at the COT which might amount to 5 dB or slightly more. Since the channel is not used for conversation in the on-hook state, and since the resulting noise level is far too low to interfere with the FSK signals, the increase in noise is of no consequence.

Capacitor C1 guarantees that a voiceband path through transformer T1 exists in both the on and off-hook states, and since all circuitry is continuously energized in accordance with the general requirement, it is clear that a bidirectional voiceband path is always available for the FSK signals. The present invention does not impair that operation. The transmit circuitry at the COT is not involved in the low tone transmission path.

While the system described has been concerned with passing a sub-audible frequency delivered by an external source, it is clear that the narrowband path so formed, from low tone filter input at the RT, to low tone filter output at the COT, is equally suitable for the transmission of internally generated sub-audible frequencies which are keyed on and off in response to low speed data signals, whether these data signals originate locally in the channel itself, or are somehow received from external sources. Such a scheme, for example, with the low tone transmission roles of COT and RT reversed, could be used to transmit information to control the parameters of a remotely provisionable channel unit at the RT from the COT. It should also be clear that in such a device a keyed subaudible tone oscillator with suitably controlled rise and fall times, that is to say suitably controlled output spectrum, might be substituted for the transmitting low tone filter. It should also be clear that the low tone narrowband path could be incorporated in the COT to RT direction, rather than in the RT to COT direction, and that a subaudible narrowband path could also be furnished in both directions if different frequencies were used in each direction.

While the present invention has been described in an embodiment where the filtered and level controlled low tone is combined with the filtered and level controlled voiceband signals prior to being encoded at the RT, it should be appreciated that the filtered and level controlled low tone and the filtered and level controlled voiceband signals may each be separately encoded at the RT and then the digital signals resulting therefrom combined into a single digital signal for transmission to the central office.

In one embodiment for the schematic diagram of FIG. 4, the following component values were used:

R1=R2=470 ohms
R3=3240 ohms
R4=845 ohms
R5=100 ohms
R6=100 Kohms
R7=127 Kohms
R8=R22=R23=R26=10 Kohms
R9=15.8 Kohms
R17=649 Kohms
R18=2430 ohms
R19=237 Kohms
R20=14.3 Kohms
R21=205 ohms
R24=3320 ohms
R25=80.6 Kohms (typical)
R27=15 Kohms
R28=30.1 Kohms
C1=1.33 uf
C5=C6=0.187 uf.

In one embodiment for the schematic diagram of FIG. 5, the following component values were used (where a component value is not given below for a resistor or capacitor shown in the schematic it is because it has the same value as the identically designated component of FIG. 4):
R6=102 Kohms
R7=162 Kohms
R9=R17=43.2 Kohms
R18=2550 ohms
R23=32.4 Kohms
R24=24.3 Kohms
R25=95.3 Kohms (typical)
R35=1000 ohms It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

What is claimed is:

1. A digital loop carrier system comprising:
   (a) a first end;
   (b) a second end; and
   (c) transmission means connecting said first and second ends;
   (d) said first end comprising:
   (i) first means having an input and an output, said first means for passing only that part of an analog signal at said input which is in a predetermined frequency band to said output;
   (ii) second means having a narrow bandwidth for passing only a tone having a frequency below said predetermined frequency band included in said analog signal at said first means input, said second means also for controlling the amplitude of said tone to fall within a predetermined amplitude range; and
   (iii) means responsive to said analog signal at said first means output and to said amplitude controlled tone for encoding said analog signals and said tone into a digital signal for transmission by said transmission means to said second end.

2. The digital loop carrier system of claim 1 wherein said first end further comprises means for combining said first means output analog signal and said controlled amplitude tone into one signal, said encoding means encoding said one signal into said digital signal.

3. The digital loop carrier system of claim 1 wherein said second end comprises;
   (a) means for decoding said first end transmitted digital signal into an analog signal which includes said tone; and
   (b) means responsive to said decoded analog signal for passing only said tone and for controlling the amplitude of said tone.

4. The digital loop carrier system of claim 2 wherein said second end comprises:
   (a) means for decoding said first end transmitted digital signal into an analog signal which includes said tone; and
   (b) means responsive to said decoded analog signal for passing only said tone and for controlling the amplitude of said tone.

5. The digital loop carrier system of claim 3 wherein said second end further comprises means for combining said decoded analog signal and said decoded passed and amplitude controlled tone into a further analog signal.

6. The digital loop carrier system of claim 4 wherein said second end further comprises means for combining said decoded analog signal and said decoded passed and amplitude controlled tone into a further analog signal.

7. The digital loop carrier system of claim 1 wherein said predetermined frequency band is the telephone voiceband and said tone frequency is less than 200 Hz.

8. The digital loop carrier system of claim 7 wherein said tone frequency is about 36 Hz.

9. The digital loop carrier system of claim 8 wherein said predetermined amplitude range has upper and lower limits such that said amplitude controlled tone is encoded into a digital signal having an equivalent power in the range from −59 EdBm to −42 EdBm.

10. A system for transmitting a low frequency tone over a digital loop carrier system said carrier system having first and second ends, said first end including means having an input at which a first analog signal which includes said low frequency tone appears for passing only that part of said first analog signal which is in a predetermined frequency band above said tone frequency, said first end also including means for encoding said passed part of said first analog signal and an amplitude controlled tone into a digital signal for transmission to said second end, said second end including means for decoding said first end transmitted digital signal into a second analog signal which includes said tone, said tone transmitting system comprising:
   (i) means having a narrow bandwidth connected to said passing means input and said encoding means and responsive to first analog signal for both passing only said tone and generating said amplitude controlled tone by controlling the amplitude of said tone to fall within a predetermined range; and
   (ii) means responsive to said second analog signal for both passing only said tone and controlling the amplitude of said tone.

11. The low frequency tone transmitting system of claim 10 wherein said predetermined frequency band is the telephone voiceband and said tone frequency is less than 200 Hz.

12. The low frequency tone transmitting system of claim 11 wherein said tone frequency is about 36 Hz.

13. The low frequency tone transmitting system of claim 12 wherein said predetermined amplitude range has upper and lower limits such that said amplitude controlled tone is encoded into a digital signal having an equivalent power in the range from −59 EdBm to −42 EdBm.

14. The low frequency tone transmitting system of claim 10 wherein said first end passing means has an output and said low frequency tone transmitting system further comprises means for combining said passed part of said first analog signal and said amplitude controlled tone into one signal, said encoding means encoding said one signal into said digital signal.

15. The low frequency tone transmitting system of claim 10 further comprising at said second end means for combining said second analog signal and said passed and controlled amplitude tone into a further analog signal.

16. A low frequency tone transmitting system for connection to a digital loop carrier system, said carrier system having first and second ends, said first end including means having an input at which a first analog signal which includes said low frequency tone appears for passing only that part of said first analog signal which is in a predetermined frequency band above said tone frequency, said first end also including means for encoding said passed part of said first analog signal and an amplitude controlled tone into a digital signal for transmission to said second end, said second end including means for decoding said first end transmitted digital signal into a second analog signal which includes said tone, said tone transmitting system comprising:

(i) means having a narrow bandwidth for connection to said passing means input and said encoding means and responsive to first analog signal for both passing only said tone and generating said amplitude controlled tone by controlling the amplitude of said tone to fall within a predetermined range; and (ii) means for connection to said second end decoding means and responsive to said second analog signal for both passing only said tone and controlling the amplitude of said tone.

17. The low frequency tone transmitting system of claim 16 wherein said predetermined frequency band is the telephone voiceband and said tone frequency is less than 200 Hz.

18. The low frequency tone transmitting system of claim 17 wherein said tone frequency is about 36 Hz.

19. The low frequency tone transmitting system of claim 18 wherein said predetermined amplitude range has upper and low limits such that said amplitude controlled tone is encoded into a digital signal having an equivalent power in the range from −59 EdBm to −42 EdBm.

20. The low frequency tone transmitting system of claim 16 wherein said first end passing means has an output and said low frequency tone transmitting system further comprises means having a first input connected to said narrow bandwidth means, a second input for connection to said passing means output and an output for connection to said encoding means for combining said passed part of said first analog signal and said amplitude controlled tone into one signal, said encoding means encoding said one signal into said digital signal.

* * * * *